United States Patent [19]
Sato et al.

[11] Patent Number: 5,177,762
[45] Date of Patent: Jan. 5, 1993

[54] SATURABLE REACTOR

[75] Inventors: Yukio Sato; Mitsuo Inoue; Kenyu Haruta; Akihiro Suzuki; Hitoshi Wakata, all of Amagasaki, Japan

[73] Assignee: Mitsubishi Denki Kabushiki Kaisha, Tokyo, Japan

[21] Appl. No.: 660,850

[22] Filed: Feb. 26, 1991

[30] Foreign Application Priority Data

Mar. 6, 1990 [JP] Japan .................................. 2-55603
Mar. 9, 1990 [JP] Japan .................................. 2-59313
Mar. 13, 1990 [JP] Japan .................................. 2-63053

[51] Int. Cl.$^5$ .............................................. H01S 3/06
[52] U.S. Cl. ...................................... 372/66; 372/37; 372/61; 372/62; 372/67; 372/87
[58] Field of Search ................ 372/37, 61, 66, 62, 372/67, 87

[56] References Cited

U.S. PATENT DOCUMENTS 4,475,199  10/1984  Sanders et al. ................ 372/37
4,974,228  11/1990  Petersen ........................ 372/37

FOREIGN PATENT DOCUMENTS 3-141621  6/1991  Japan .

OTHER PUBLICATIONS

Applied Physics Letter, 48 (1986) pp. 1574–1576, High Efficiency Xecl Laser with Spiker and Magnetic Isolation, Fisher, et al.

Primary Examiner—Georgia Y. Epps
Attorney, Agent, or Firm—Oblon, Spivak, McClelland, Maier & Neustadt

[57] ABSTRACT

A saturable reactor comprising a magnetic core (1) having an annular or an elongated race-track configuration, an electrical insulator (6) disposed around the magnetic core and a conductor winding (3) wound around the insulator (6). A coolant duct (7) is provided in the insulator to extend radially transversely across the magnetic core and having a radially separated inlet and outlet (8,9). A saturable reactor may comprises an annular magnetic core (51), a conductor winding including a first conductor (55) surrounded by the magnetic core (51) and a second conductor (56) disposed around the magnetic core and connected to the first conductor (55) through a load. A control winding (54) extends through the first and second conductors (55,56), and at least one of the first and second conductors (55,56) has a notch or a through hole (57,59) for insulatingly receiving the control winding (54) therein. Also disclosed is a laser oscillator comprising a gas-filled laser chamber (81) in which a main electrode pair (82,83) is disposed in an opposing relationship to define a laser-excited discharge region therebetween. At least some of the components of an oscillation circuit for generating a laser oscillation are disposed within a first circuit component chamber (95) disposed adjacent to the laser chamber (81) and filled with an electrically insulating gas, and some other components are disposed within a second circuit component chamber (96) disposed adjacent to the first circuit component chamber (95) and filled with an electrically insulating oil.

23 Claims, 12 Drawing Sheets

PRIOR ART

SATURABLE REACTOR

BACKGROUND OF THE INVENTION

This invention relates to a saturable reactor for use in an apparatus in which quick-rising pulses are needed such as a pulse laser apparatus.

Figure 17:
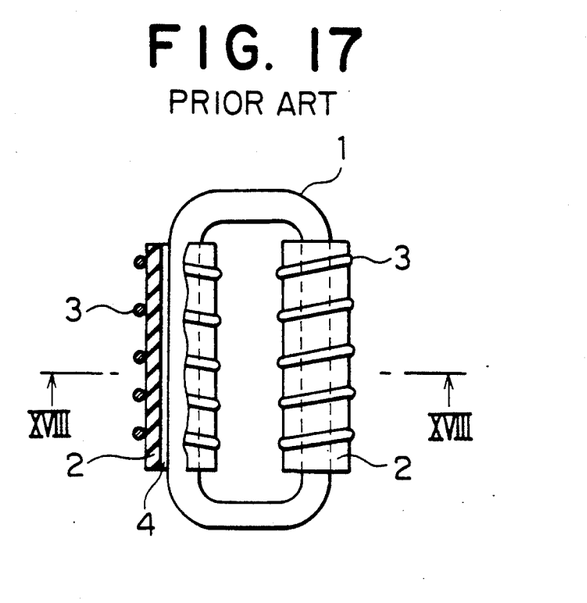
FIG. 17 is a partially cut-away plan view of a conventional saturable reactor.
Figure 18:
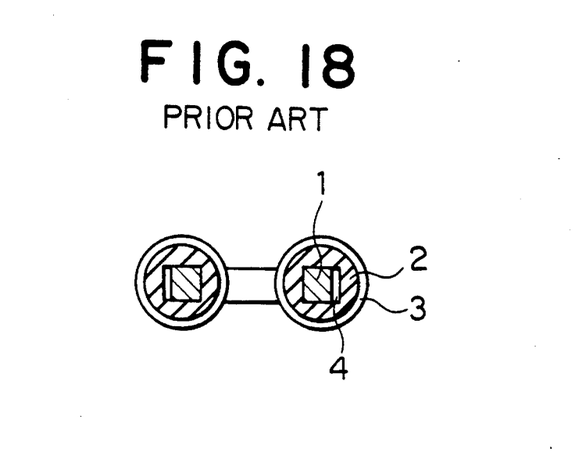
FIG. 18 is a sectional view taken along line XVIII—XVIII of FIG. 17.

FIGS. 17 and 18 illustrate a conventional saturable reactor disclosed in "Radio Section, Paper No. 1034 (1951)", p. 185, W. S. Melville, of which FIG. 17 is a partially cut away plan view and FIG. 18 is a sectional view of the saturable reactor. In these figures, reference numeral 1 indicates a race-track magnetic core, 2 is an electrically insulating member, 3 is a conductor winding and 4 is a cooling duct defined between a side surface of the magnetic core 1 and the insulating member 2.

The operation will now be described. In FIGS. 17 and 18, the race-track magnetic core 1 is made of a lamination of a thin magnetic tape and an insulating tape and is wound in multi-layers. The insulating member 2 is disposed around the magnetic core 1, and a conductor winding 3 is wound around the insulating member 2. Cooling of the magnetic core 1 is achieved by flowing a coolant through the duct 4 which is a gap defined between the side surface of the magnetic core 1 and the insulating member 2 and extending along the length of the magnetic core 1.

Figure 19:
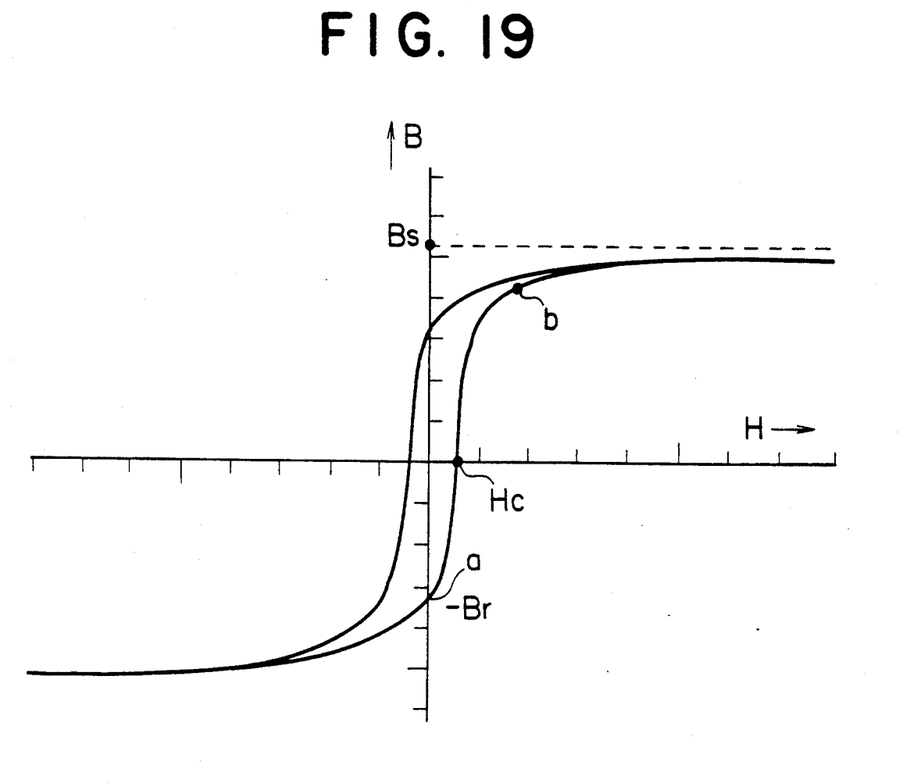
FIG. 19 is a graph showing the magnetic characteristic of a magnetic core used in a saturable reactor.

FIG. 19 is a characteristic diagram illustrating magnetic characteristics of the magnetic core used in the saturable reactor. At first, the magnetic core is at a point a or $B = -Br$ and $H=0$, where it is saturated by a reverse current $-Ib$ flowing through the control winding. As a current I flowing through the conductor winding is increased, a magnetizing force $H (=2\pi I/l$; where l is the length of the magnetic path of the core) proportional to the current I generates, whereby the magnetic material of the race-track magnetic core is magnetized in accordance with the magnetizing force H and a magnetic flux density B dependent upon the property of the magnetic material generates, and the magnetizing force substantially linearly increases through the magnetic coercive force Hc which is determined by the magnetic material and the operating frequency until it reaches a point b. At this time, the inductance L of the magnetic core is proportional to the relative permeability $\mu r = dB/dH$ of the magnetic core, and the voltage held by the magnetic core is $V = L \cdot (dI/dt)$. After the magnetic flux density B reaches point b of the saturable magnetic flux density Bs, it increases only a little even when the coercive force H is increased and the specific magnetic permeability $\mu r$ of the magnetic core becomes 1, the inductance L of the magnetic core is greatly decreased, so that the voltage held by the race-track magnetic core becomes substantially zero, thereby to generate a voltage across the load. Thus, the saturable reactor serves as a kind of switch in which the inductance rapidly decreases. At this time, an iron loss which is as large as twice the product of the coercive force Hc and the saturable magnetic flux density Bs which is a loss of the magnetic core generates, which causes the magnetic core to be heated. Since Hc increases as the operating frequency becomes high, a very large amount of heat is generated in the saturable reactor used in TEA-$CO_2$ laser and excimer laser required to be switched at a high speed.

Since the magnetic core of the saturable reactor is heated due to the iron loss during operation, the magnetic core must be cooled by a cooling medium to a predetermined lower temperature.

In the conventional saturable reactor illustrated in FIGS. 17 and 18, the magnetic core 1 is cooled by a cooling medium flowing through the coolant duct 4 extending along the side surface of the magnetic core 1.

Since the conventional saturable reactor is constructed as described above, the cooling medium can remove the generated heat only from the outermost or the innermost turn of the magnetic core layer which is in contact with the cooling medium. The heat generated in the core layers located near the center of the magnetic core must be radially conducted and removed through the wound layers of the magnetic tapes and the insulating tapes, which have a very poor thermal conduction efficiency which limits the cooling efficiency of the saturable reactor to be low. Also, when the cooling duct is arranged to extend along the magnetic core, i.e., in the direction of extension of the insulating tape and the magnetic tape in the laminated layer, the total length of the flow path of the cooling medium is as long as twice the magnetic path of the magnetic core and the cross-sectional area of the flow path is relatively small. Therefore, a large pressure loss is expected when a large amount of cooling medium is flowed through the long but narrow flow path, so that a large amount of coolant cannot be used. This causes the temperature of the cooling medium to be relatively rapidly elevated as the coolant proceeds through the coolant flow path, generating an undesirable large temperature difference in the coolant at the inlet and outlet of the coolant flow path.

In order to solve the above problem, Japanese Patent Application No. 1-278501 proposes to circumferentially divide the coolant flow path along the magnetic core into two sections so that the coolant flows through each of the divided shorter sections. Even with this arrangement, the length of the coolant passage cannot be made sufficiently short, the amount of the coolant cannot be greatly increased and the temperature nonuniformity cannot be satisfactorily removed.

Particularly, in saturable reactors operated in a high frequency region such as those used in switching elements for generating quick-rising pulses, the magnetic core cannot be sufficiently cooled and the operation of the saturable reactor cannot be repeated at a high rate.

Figure 20:
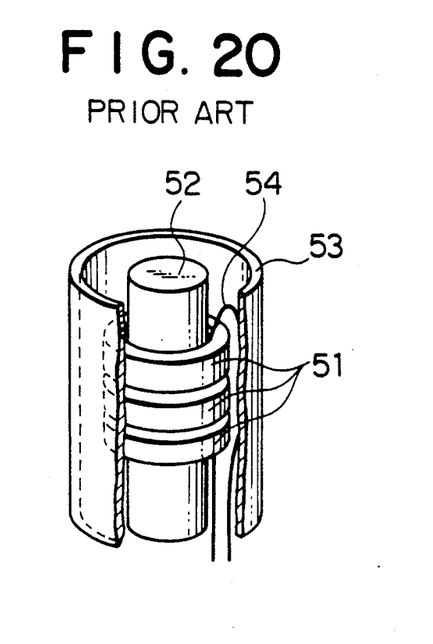
FIG. 20 is partially cut-way perspective view of a conventional saturable reactor.

FIG. 20 is a partial cut-away perspective view of another example of a conventional saturable reactor, and reference numeral 51 indicates substantially ring-shaped magnetic cores, 52 is an inner first conductor disposed within the magnetic cores 51, and reference numeral 53 is an outer second conductor disposed around the magnetic cores 51 and connected to the first conductor 52 through a load (not shown). The first conductor 52 and the second conductor 53 together constitute a conductor winding. A control winding 54 for setting up the initial state of the magnetic core 51 is provided.

In FIG. 20, the magnetic core 51 is a substantially ring-shaped member formed by winding a thin metallic tape and a nonmagnetic tape together in a plurality of laminated layers, and the first conductor 52, the load (not shown), and the second conductor 53 are electrically connected in series in the named order to constitute a saturable reactor. The magnetic characteristic of the magnetic core used in the saturable reactor is similar to that shown and described in conjunction with FIG. 19.

The inductance of the actual saturable reactor $L_{total}$ when the magnetic core is un-saturated can be expressed by the sum of the inductance of the un-saturated magnetic core $L_{unsat}$ and the stray inductance $L_{stray}$ other than that in the magnetic core. That is, when the saturable core is unsaturated, $$L_{total} = L_{unsat} + L_{stray} \quad (1)$$

and when the saturable core is saturated, $$L_{total} = L_{sat} + L_{stray} \quad (2)$$

The characteristic of the saturable reactor as a switch is determined by the ratio of the equation (1) to the equation (2) or equation (1)/equation (2), and the larger this ratio the better the switching characteristic of the reactor.

Figure 21:
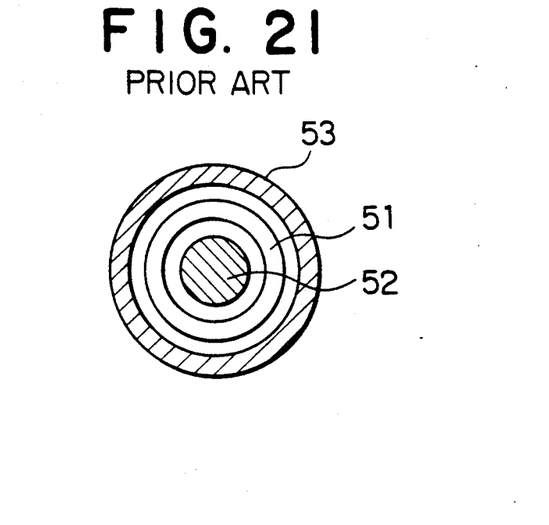
FIG. 21 is a sectional diagram of the magnetic core used in the saturable reactor.
Figure 22:
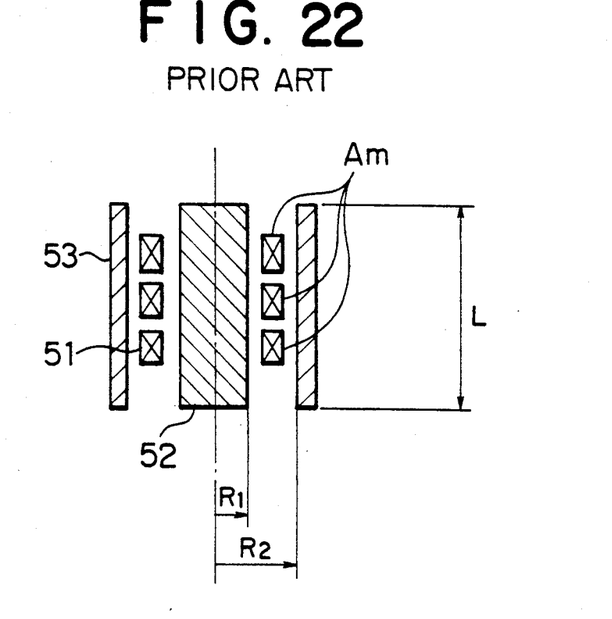
FIG. 22 is a sectional diagram of the magnetic core used in the saturable reactor.

FIGS. 21 and 22 are a diagramatic cross-sectional view and a diagramatic longitudinal-sectional view, respectively, of the saturable reactor for explaining the above, in which R1 indicates an outer diameter of the inner conductor 52, R2 is an inner diameter of the outer conductor 53, and L indicates an axial length of the saturable reactor. The cross-sectional area As of an annulus defined between the first and the second conductors 52 and 53 is $(R2-R1) \cdot L$. When the magnetic core saturates and $\mu r = 1$ and $(R2-R1) > R1$ stand, where $\mu o$ is magnetic permeability of vacuum, the inductance of the saturable reactor $L_{total}$ can be expressed by the following equation:

$$L_{total} = \mu o \cdot As / 2\pi \cdot R1 \quad (3)$$

On the other hand, when the magnetic core is unsaturated, i.e., $\mu o >> 1$, the inductance of the saturable reactor $L_{total}$ can be expressed by the following equation:

$$L_{total} = \mu o \cdot \mu r \cdot Am/l + \mu o (As - Am)/2\pi \cdot R1 \quad (4)$$

where, Am is an effective cross-sectional area of the magnetic cores 51. Assuming that $2\pi \cdot R1 \approx 1$, the ratio between the equations (3) and (4), which indicates the characteristic of the saturable reactor as a switch, can be expressed by the following equation:

$$(\mu r - 1) \cdot (Am/As) + 1 \quad (5)$$

In the conventional saturable reactor illustrated in FIG. 20, an air gap must be provided between the magnetic cores 51 and the first and the second conductors 52 and 53 so that the control winding 54 (FIG. 20) may be disposed within the air gap, so that Am becomes much larger than As. Therefore, since Am/As=0.5 in the saturable reactor of such structure, the switching characteristics is reduced to half. Also, since the relative magnetic permeability decreases as the frequency used increases, the relative magnetic permeability $\mu r$ of the magnetic member decreases to several hundreds to thousands in the saturable reactor used in a pulse laser apparatus in which the frequency region of the current is very high, so that, when the stray inductance $L_{stray}$ other than the magnetic core becomes sufficiently small as compared to the inductance $L_{unsat}$ of the magnetic core, the switching characteristics become very poor.

Since an air gap must be provided between the magnetic core and the first and the second conductor for disposing the control winding therein in the conventional saturable reactor, the stray inductance caused by this air gap is large, and the switching characteristics degrade in a saturable reactor which operates in a high frequency region such as those used in a pulse laser apparatus in which pulses having a particularly quick pulse rising-time are needed.

Figure 23:
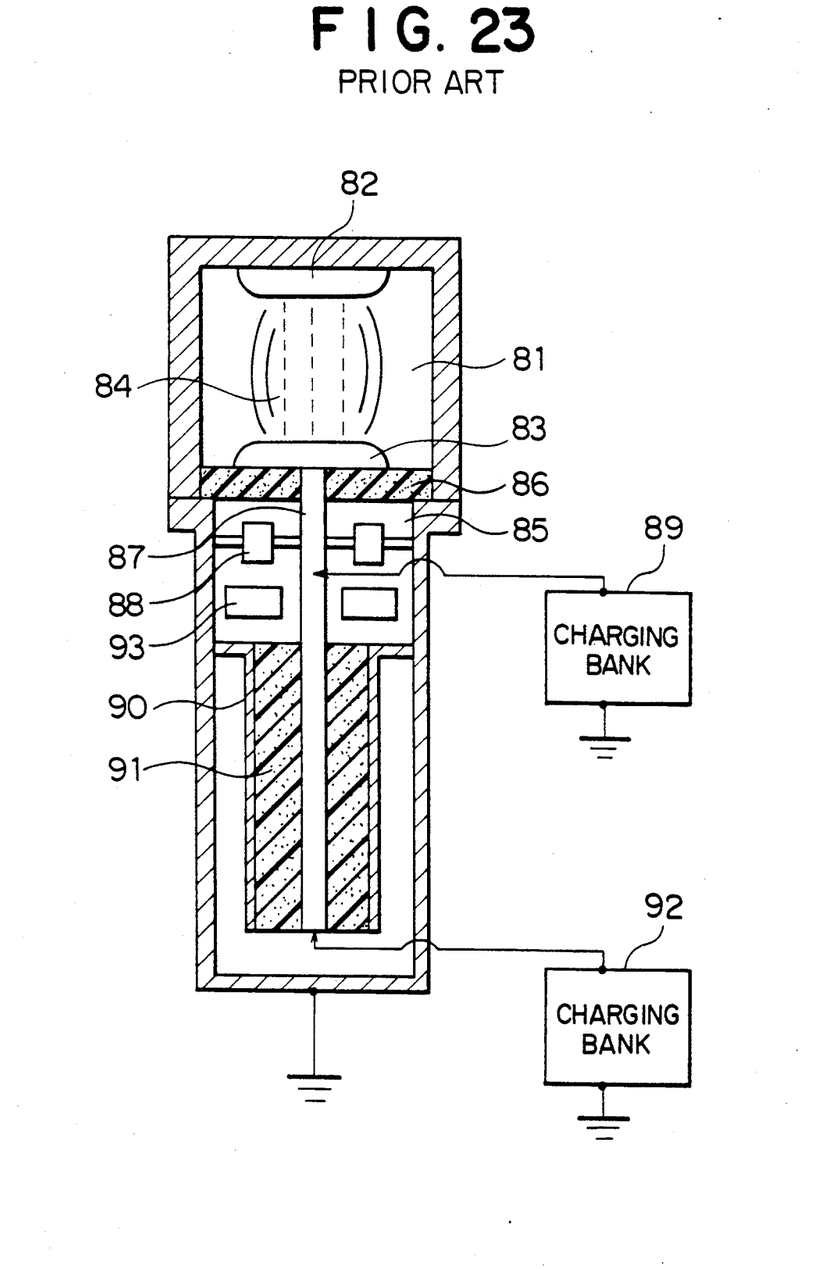
FIG. 23 is a sectional view of a conventional laser oscillator.

FIG. 23 illustrates, in a sectional schematic diagram, a conventional laser oscillator disclosed in Applied Physics Letter, Vol. 48. No. 23,1574 (1986). For example, in which reference numeral 81 indicates a laser chamber, 82 and 83 are first and second main electrodes disposed in an opposing relationship within the laser chamber 81. Reference numeral R4 is a laser excitation discharge, 85 is a circuit component chamber, filled with an electrically insulating oil and disposed adjacent to the laser chamber 81, for accommodating one portion of a discharge excitation circuit for generating the laser excitation discharge 84 immersed within the insulating oil, 86 is a first insulating plate serving as a barrier wall between the laser chamber 81 and the circuit component chamber 85, 87 is an electrically conductive plate for conducting a high voltage to the second main electrode 83, 88 is a first capacitor for applying a high pulse voltage across the first and the second main electrodes 82 and 83 for initiating the excitation discharge, 89 is a first charging bank for charging the first capacitor 88, 90 is a second capacitor for supplying an excitation energy into the excitation discharge, 91 is a dielectric forming the second capacitor 90, 92 is a second bank for charging the second capacitor 90, and 93 is a magnetic saturable switch for storing the energy of the second capacitor 90.

A laser gas is filled within the laser chamber 81, and the second charging bank 92 is operated to pulse charge the second capacitor 90. Then the first charging bank 89 is operated to pulse charge the first capacitor 88. At this time, the charging voltage on the first capacitor 88 is also applied across the first and the second main electrodes 82 and 83 because the first capacitor 88 is connected in parallel to the first and the second main electrodes 82 and 83. When the voltage across the first and the second main electrodes 82 and 83 reaches its discharge initiating voltage, the electric charge stored on the first capacitor 88 is discharged across the first and the second main electrodes 82 and 83 to define a laser excitation discharge 84. By pre-ionizing the region in which excitation discharge 84 takes place beforehand with X-rays, ultra-violet rays and the like, the laser excitation discharge 84 becomes a uniform discharge suitable for the laser excitation. When the laser excitation discharge 84 is initiated, the magnetic saturable switch 93 is switched to allow the electric charge stored on the second capacitor 90 to rush into the laser excitation discharge region, whereupon the laser oscillation is initiated.

In such a laser oscillator, the laser chamber 81 is filled with a laser gas, and the circuit component chamber 85 containing one portion of the excitation circuit (electric circuit components) is filled with an electrically insulating oil in view of the requisite strong insulation. When the laser excitation discharge 84 is initiated, the magnetically saturable switch 93 is switched to allow the electric charge stored on the second capacitor 90 to flow into the laser excitation discharge portion thereby to initiate the laser oscillation.

In the above oscillator, the laser gas is filled within the laser chamber 81, and an electrically insulating oil is filled within the circuit component chamber 85 accommodating one portion of the excitation circuit (electric circuit components). Therefore, any barrier wall or partition is necessary between the laser chamber 81 and the circuit component chamber 85, and an electrically insulating plate 86 made of an insulating material is necessary because a high voltage must be supplied to the second main electrode 83. With the excimer laser in which the laser is oscillated in a ultra-violet region and the laser gas is corrosive, the insulating material to be used must be tetrafluoroethylene known as Teflon (trade name), vinyl chloride resin or the like.

With the conventional laser oscillator as above constructed, the insulating oil passes through the first insulating plate made of tetrafluoroethylene, vinyl chloride resin or the like and intrudes into the laser chamber, deteriorating the laser gas. Also, since the insulating plate is subject to the internal pressure in the laser chamber, the first insulating plate made of tetrafluoroethylene and vinyl chloride resin has difficulty maintaining its mechanical strength.

SUMMARY OF THE INVENTION

Accordingly, one object of the present invention is to provide a saturable reactor free from the above-discussed problems of the conventional designs.

Another object of the present invention is to provide a saturable reactor having a high cooling efficiency and in which the temperature difference in the coolant is small.

Still another object of the present invention is to provide a saturable reactor which has a large amount of the coolant and in which the temperature distribution is uniform.

Further object of the present invention is to provide a saturable reactor which can be sufficiently cooled and operation at a high frequency can be repeated at a high rate.

Another object of the present invention is to provide a saturable reactor in which the stray inductance is small and the high frequency switching characteristics is good.

Another object of the present invention is to provide a laser oscillator in which the insulating oil does not intrude into the laser chamber and the laser gas is not deteriorated.

Still another object of the present invention is to provide a laser oscillator in which the mechanical strength of the insulating partition is sufficiently strong.

With the above objects in view, the saturable reactor of the present invention comprises a magnetic core having an annular or an elongated race-track configuration, and a conductor winding is wound around an insulator disposed around the magnetic core. A cooling duct is defined between the magnetic core and the insulator assembly so that it extends radially transversely across the magnetic core and has an inlet and an outlet radially separated from one another.

In another aspect of the present invention, the saturable reactor comprises a conductor winding including a first conductor surrounded by the magnetic core and a second conductor disposed around the magnetic core and connected to the first conductor through a load. A control winding extending through the first and second conductors is electrically insulated from the first and second conductors, and at least one of the first and second conductors have a notch or a through hole for receiving at least one of the first and second conductors.

In still another aspect of the present invention, the laser oscillator comprises a laser chamber in which a laser gas is filled, and a main electrode pair disposed within the laser chamber in an opposing relationship to define a laser-excited discharge region therebetween. An oscillation circuit is connected across the electrode pair for applying a high voltage thereacross to generate laser excited discharge and for supplying an excitation energy to the laser-excited discharge region to generate a laser oscillation. Adjacent to the laser chamber a first circuit component chamber filled with an electrically insulating gas is disposed, and a second circuit component chamber is disposed adjacent to the first circuit component chamber and is filled with an electrically insulating oil.

BRIEF DESCRIPTION OF THE DRAWINGS

The present invention will become more readily apparent from the following detailed description of the preferred embodiment of the present invention taken in conjunction with the accompanying drawings, in which:

FIG. 7 is a sectional view taken along line VII—VII of FIG. 6;

DESCRIPTION OF THE PREFERRED EMBODIMENTS

Figure 1:
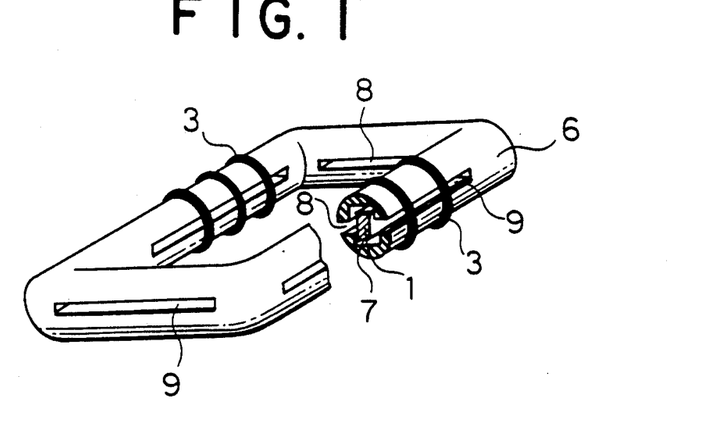
FIG. 1 is a partially cut-away perspective view of the saturable reactor of the present invention.
Figure 2:
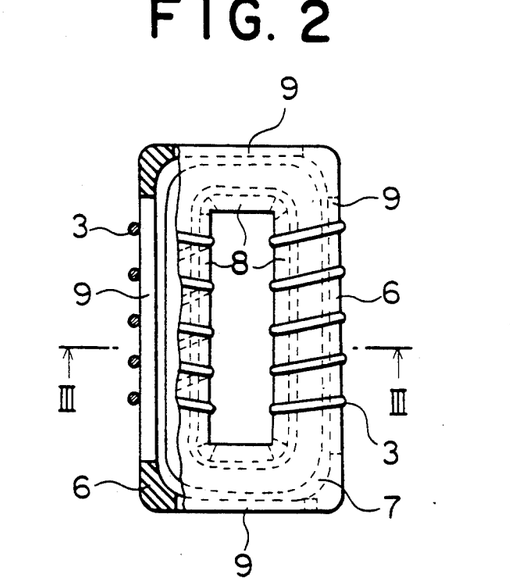
Figure 3:
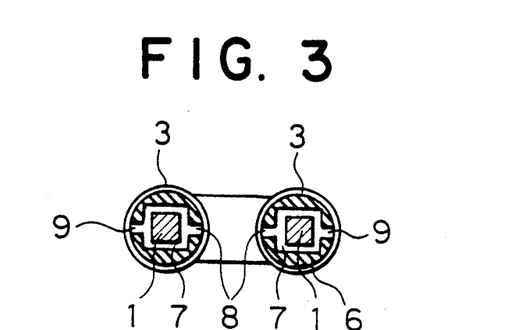
FIG. 3 is a sectional view taken along line III—III of FIG. 2.

In FIG. 1 in which one embodiment of the saturable reactor of the present invention is illustrated, reference numeral 1 is a magnetic core having a substantially race-track configuration and surrounded by an insulating member 6 around which a conductor winding 3 is wound. It is seen that a cooling duct 7 is defined between the magnetic core 1 and the insulating member 6 to surround the magnetic core 1 for allowing a cooling medium (not shown) to flow therethrough. The cooling duct 7 has a cooling medium inlet port 8 defined by an axially extending slit formed in an inner circumferential surface of the insulating member 6 and a cooling medium outlet port 9 defined by a slit formed in an outer circumferential surface of the insulating member 6.

Since the iron loss in the magnetic core 1 of the saturable reactor during its switching operation causes the core temperature to increase, it is necessary to cool the magnetic core 1 to a predetermined temperature. In order to achieve this cooling, a cooling medium is supplied through the cooling medium inlet port 8 into the duct 7 in which the cooling medium flows in the radial direction across the magnetic core 1 in contact therewith and the cooling medium is exhausted through the outlet port 9.. During this radial flow of the cooling medium, the cooling medium efficiently removes the heat from the magnetic core surface, and the heat inside of the magnetic core 1 is efficiently conducted to its surface through a metallic tape. Since the cooling medium flows transversely across the magnetic core 1 and not along the longitudinal direction of the magnetic core 1, the cross-sectional area of the cooling medium flow passage is made very large and the length of the cooling medium flow passage is very short. Therefore a very large amount of radial cooling medium flow can be generated, and the temperature rise of the cooling medium can be made small, thereby significantly improving the cooling efficiency and cooling capacity of the cooling system of the saturable reactor.

Also, since the magnetic core 1 is efficiently cooled and is maintained at a relatively low uniform temperature, the saturable reactor can be operated at a high repeatition rate at a high frequency region in order to generate short pulses.

While the race track-shaped magnetic core 1 of the above embodiment has been described as being a multi-turn winding of laminations of the metallic tape and the insulating tape, the race track-shaped magnetic core 1 may be made by ferrite.

Figure 4:
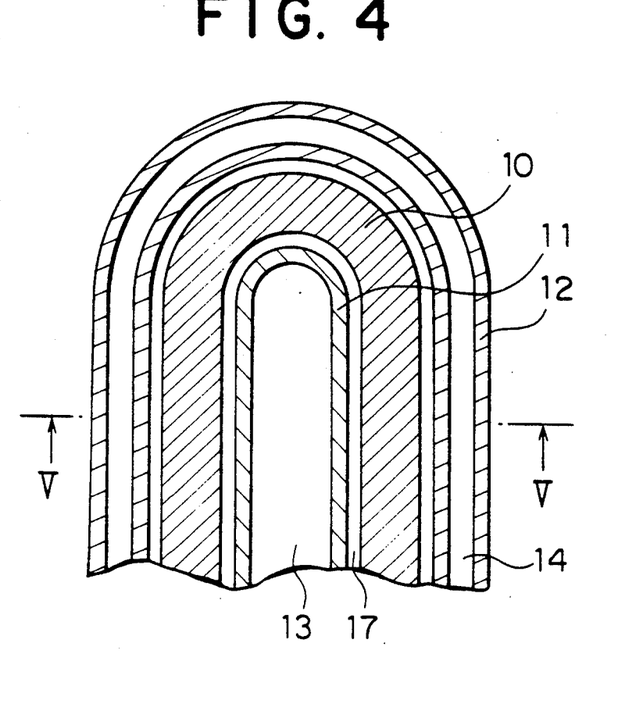
FIG. 4 is a fragmental sectional plan view of the saturable reactor of another embodiment of the present invention.
Figure 5:
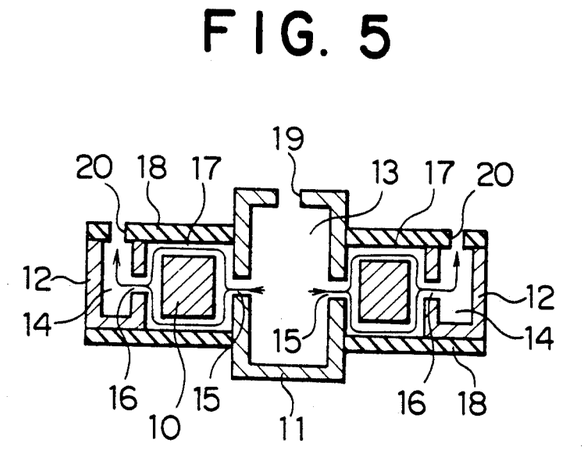
FIG. 5 is a sectional view taken along line V—V of FIG. 4.

FIGS. 4 and 5 illustrate another embodiment of the saturable reactor of the present invention which is particularly useful in high speed switching and which comprises a race-track magnetic core 10 and a single-turn conductor winding including an inner conductor 11 and an outer conductor 12. As seen from FIGS. 4 and 5, the inner conductor 11 has a hollow portion or cavity 13 and the outer conductor 12 has a hollow portion or cavity 14, and slits 15 and 16 are formed in one portion of the conductors 11 and 12, respectively, so that a cooling medium may be flowed through a core duct 17 defined by an insulating housing wall 18 disposed around the magnetic core 10. It is seen that the inner conductor 11 has formed in its wall slits 19 which serve as coolant inlets, and the insulating housing wall 18 has formed therein slits 20 which serve as coolant outlets. Thus, a flow path for coolant passage extends radially from the central coolant inlet 19 formed in the inner conductor 11, the central cavity 13 formed in the inner conductor 11, the slit 15 in the inner conductor 11, the core duct 17 around the magnetic core 10, the slit 16 in the outer conductor 12 and the cavity 14 in the outer conductor 12 to the coolant outlet 20 formed in the housing wall 18.

While the cavities 13 and 14 are provided in the inner and the outer conductors 11 and 12 respectively, in the above embodiment only one of them may be provided.

Figure 6:
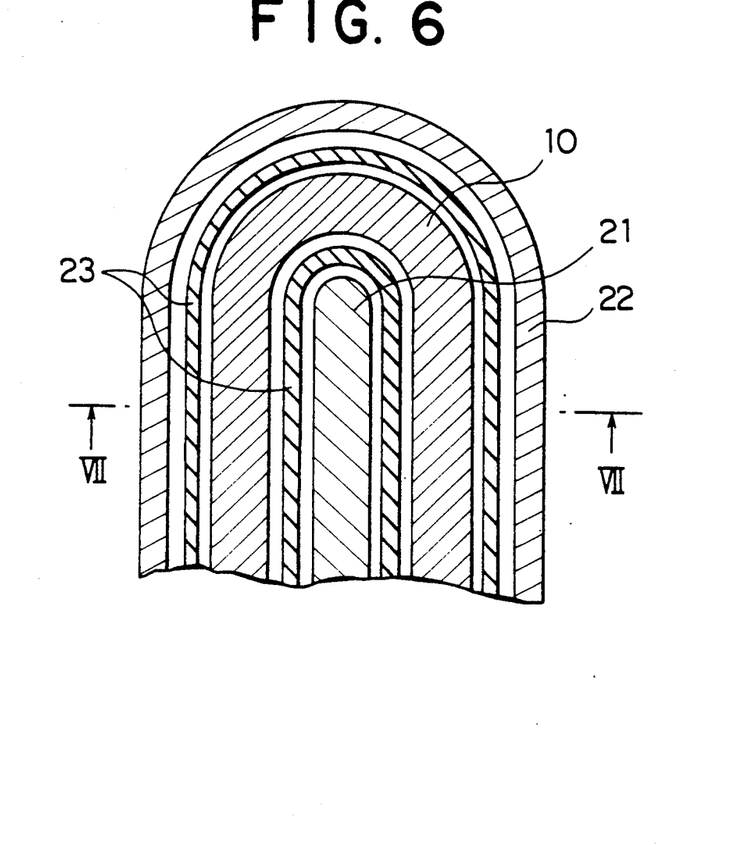
FIG. 6 is a fragmental sectional plan view of the saturable reactor of another embodiment of the present invention.
Figure 7:
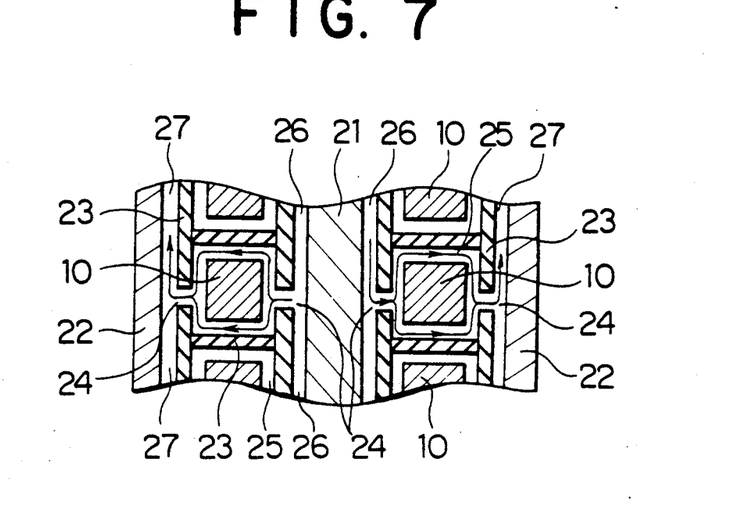
FIG. 7 is a partially cut-away plan view of the saturable reactor of FIG. 1.

FIGS. 6 and 7 illustrate another modification of the saturable reactor of the present invention which is particularly suitable for a high voltage application. The illustrated saturable reactor comprises an inner conductor 21, an outer conductor 22, a plurality of magnetic cores 10 disposed between the inner and the outer conductors 21 and 22, and an electrically insulating member 23 having a plurality of partition walls disposed between each of the above mentioned components. It is seen that the partition walls of the insulating member 23 have formed therein a plurality of slits 24 communicated with the core duct 25 defined around the magnetic cores 10. In this embodiment, the coolant flows in parallel substantially as shown by the arrows from the coolant inlet 26 to the coolant outlet 27.

As has been described, the saturable reactor of the present invention comprises an electrical insulator assembly disposed around the magnetic core, a conductor winding wound around the insulator assembly, and a coolant passage defined between the magnetic core and the insulator assembly for defining a coolant passage extending radially transversely across the magnetic core and having an inlet and an outlet radially separated from one another.

Figure 8:
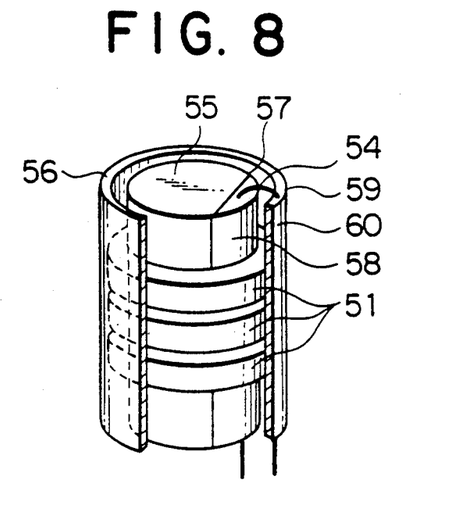
FIG. 8 is a partially cut-away perspective view of one embodiment of the saturable reactor of the present invention.

FIG. 8 illustrates another embodiment of the present invention in which the present invention is applied to the conventional saturable reactor illustrated in FIGS. 20 to 22. In FIG. 8, the saturable reactor comprises annular magnetic cores 51 and a conductor winding which includes a substantially cylindrical, inner first conductor 55 surrounded by the ring-shaped magnetic cores 51 and a substantially hollow cylindrical, outer second conductor 56 disposed around the magnetic cores 51. The first conductor 55 and the second conductor 56 are electrically connected through a load (not shown). A control winding 54 is disposed to extend around the magnetic cores 51 and through the first and the second conductors 55 and 56.

According to the present invention, the inner first conductor 55 has formed in its cylindrical circumferential surface a notch 57 through which the conductor of the control winding 54 extends without projecting from an imaginary cylindrical surface continuous from the cylindrical surface of the first conductor 55. In the illustrated embodiment, the notch 57 is filled with an electrically insulating material 58 such as vinyl chloride or plastics so that the control winding conductor 54 is insulatingly supported from the first conductor 55. The insulating material 58 has a cylindrical outer surface which provides a continuous complete circular cylindrical surface together with the cylindrical surface of the magnetic cores 51.

The second conductor 56 has formed in its cylindrical wall an axially extending through hole 59 through which the conductor of the control winding 54 extends. The through hole 59 is also filled with an electrically insulating material 60 such as vinyl chloride or a suitable plastic to insulatingly support the control winding conductor 54 from the second conductor 56.

With the above structure, since there is no need for the annular gap or clearance being provided between the first conductor 55 and the magnetic cores 51 and between the magnetic cores 51 and the second conductor 56, the outer circumference of the first conductor 55 can be made to substantially coincide with the inner circumference of the magnetic cores 51, and the inner circumference of the second conductor 56 can be made to substantially coincide with the outer circumference of the magnetic cores 51. Therefore, the vacant space in the saturable reactor can be eliminated except for the small clearances necessary for cooling the magnetic cores 51. In other words, the relationship $As \approx Am$ can be realized and the stray inductance other than the magnetic cores 51 can be reduced, so that the ratio between the inductance at the non-saturated condition and the inductance at the saturated condition can be made large, whereby the switching characteristic of the saturable reactor is significantly improved.

Figure 9:
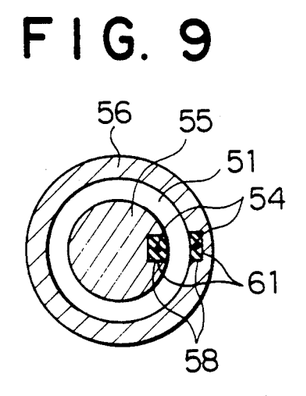
FIG. 9 a cross sectional view illustrating another embodiment of the saturable reactor of the present invention.

FIGS. 9 to 13 illustrate various modification of the arrangement for accommodating the control winding 54 in the saturable reactor of the present invention. In FIG. 9, each of the first conductor 55 and the second conductor 56 has an axially extending groove 61 of a substantially rectangular cross-section. The grooves 61 are filled with an insulating material 58 to insulatably support the control winding 54 within the grooves 61. The magnetic core 51 is disposed between the first and the second conductors 55 and 56 with substantially no air gap therebetween.

Figure 10:
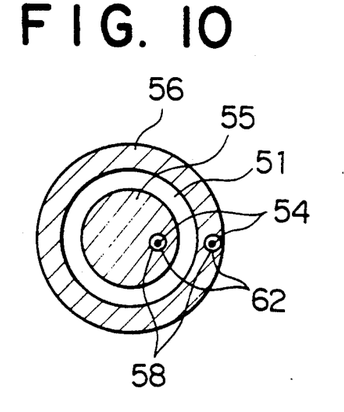
FIG. 10 is a cross-sectional view illustrating another embodiment of the saturable reactor of the present invention.

In FIG. 10, a through hole 62 of a circular cross-section is formed to axially extend through each of the first and the second conductors 55 and 56. The control winding 54 is insulatingly supported within the through holes 62 by a suitable insulating material 58.

Figure 11:
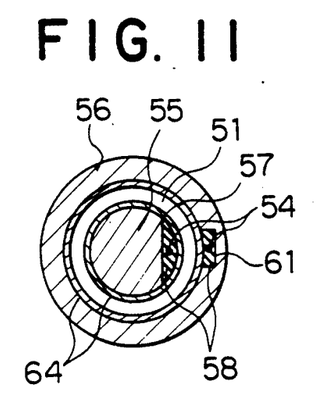
FIG. 11 is a cross-sectional view illustrating a further embodiment of the saturable reactor of the present invention.

FIG. 11 illustrates the saturable reactor of the present invention which has a thin, electrically insulating sheet 64 inserted between the first conductor 55 and the magnetic cores 51 as well as the magnetic cores 51 and the second conductor 56. This arrangement is useful when the saturable reactor is used with a high voltage.

Figure 12:
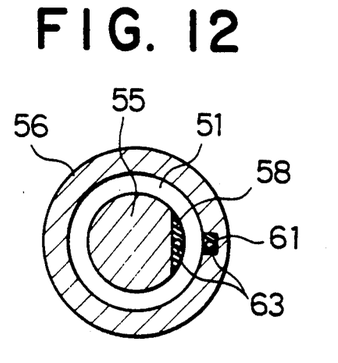
FIG. 12 is a cross-sectional view illustrating a still another embodiment of the saturable reactor of the present invention.

FIG. 12 illustrates a further arrangement in which a sheathed conductor 63 is used as the control winding conductor 54 and the insulating sheet 64 is removed, making the structure simple.

Figure 13:
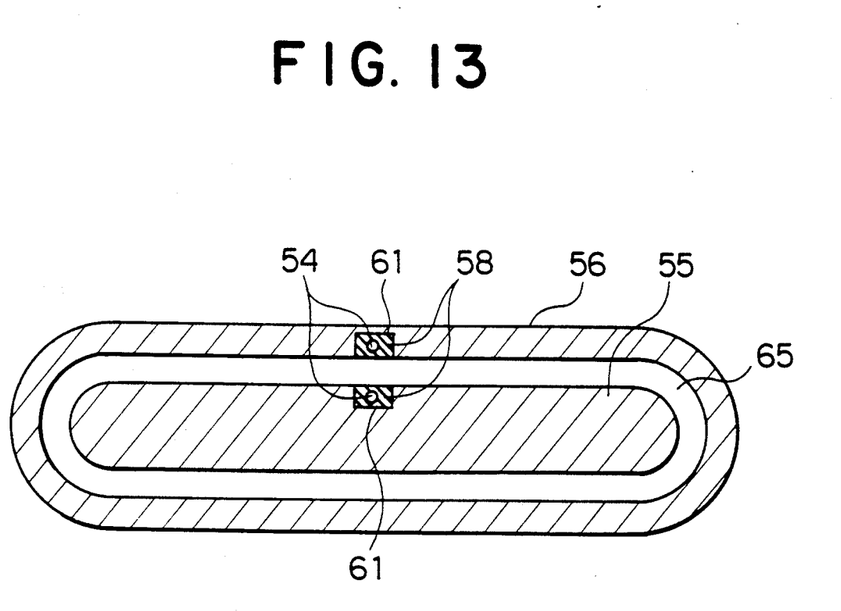
FIG. 13 is a cross-sectional view illustrating a yet another embodiment of the saturable reactor of the present invention.

FIG. 13 illustrates an arrangement of the present invention in which the control winding 54 similar to that illustrated and described in conjunction with FIG. 9 is used in a magnetic core 65 having a race-track configuration in order to improve the switching characteristic of the saturable reactor.

As has been described, the saturable reactor of the present invention comprises a control winding extending through the first and the second conductors disposed at inner and outer sides of the annular magnetic core, and the control winding is electrically insulated from the first and second conductors, and at least one of the first and second conductors have a notch or a through hole for receiving the control conductor. Therefore, the stray inductance other than the magnetic core can be minimized, and a superior switching characteristic can be obtained even when a rapid rising such as that used in the pulse laser is necessary.

Figure 14:
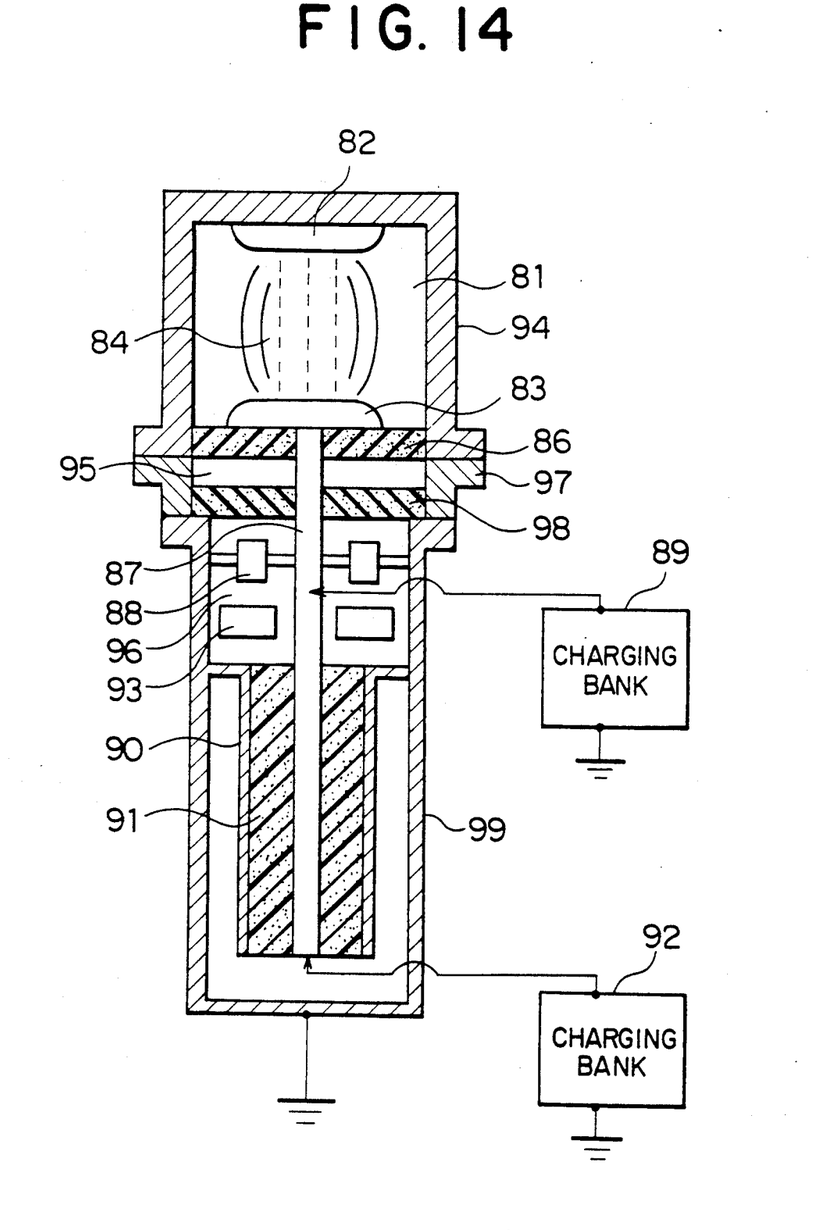
FIG. 14 is a sectional view of one embodiment of the laser oscillator of the present invention.

FIG. 14 illustrates another embodiment of the present invention in which the present invention is applied to the conventional laser oscillator illustrated in FIG. 23. In FIG. 14, the laser oscillator of the present invention comprises a laser chamber 81 in which a laser gas is filled, and a pair of main electrodes 82 and 83 disposed within the laser chamber 81 in a spaced opposing relationship to define a laser-excited discharge region 84 therebetween. Although not illustrated, an oscillation circuit including various circuit components is connected across the electrode pair 82 and 83 for applying a high voltage thereacross to generate laser-excited discharge 84 and for supplying an excitation energy to the laser-excited discharge region 84 to generate a laser oscillation. The laser chamber 81 is defined by a substantially cup-shaped housing 94 and an insulating partition wall 86 through which the electrode rod 7 extends.

The laser oscillator further comprises a first circuit component chamber 95 disposed adjacent to the laser chamber 81 and filled with an electrically insulating gas for accommodating therein at least some of circuit components of the oscillation circuit (not shown), and a second circuit component chamber 96 disposed adjacent to the first circuit component chamber 95 and filled with an electrically insulating oil (not shown) for accommodating therein at least some of circuit components of the oscillation circuit which will be described later. The first chamber 95 is disposed on one side of the insulating partition wall 86 and is defined by the partition wall 86, a ring-shaped member 97 and a second insulating partition wall 98. The second circuit component chamber 96 is defined by the second insulating partition wall 98 and a substantially cup-shaped casing 99 attached to the partition wall 98. The second circuit component chamber 96 contains capacitors 88, magnetic saturable switches 93 and a second capacitor 90 including a dielectric material 91.

The insulating gas filled in the first chamber 95 is pressurized to balance with the pressure of the laser gas filled in the laser chamber 81, so that the first insulating partition wall 86 may be made by a material of a relatively weak mechanical strength such as tetrafluoroethylene known as Teflon (trade name), vinyl chloride or the like. The insulating gas may preferably be an $SF_6$ gas, but a gas that can be easily available such as air, $N_2$ gas, etc. can be equally used.

If only an electrical insulating gas is to be used without using the insulating oil in the circuit component chamber, the insulating gas must be pressurized to as high as 3 absolute atmospheric pressure, so that the mechanical strength of the structure of the circuit component chamber must be very large to withstand the high pressure. Also, the insulating oil exhibits superior creeping insulation characteristic and cooling characteristic. Therefore, the use of the insulating gas alone in the laser oscillator does not seem practical.

According to the present invention, by making full use of the advantages of the insulating oil that it has a high creeping insulation and facilitates cooling of the circuit components and without causing the degrading of the insulation, the undesirable ingress of the insulating oil into the laser chamber is prevented thereby to prevent the laser gas from being deteriorated by the first circuit component chamber filled with the insulating gas and, at the same time, the mechanical stress acting on the relatively weak insulating partition wall is decreased to improve the reliability of the laser oscillator.

Figure 15:
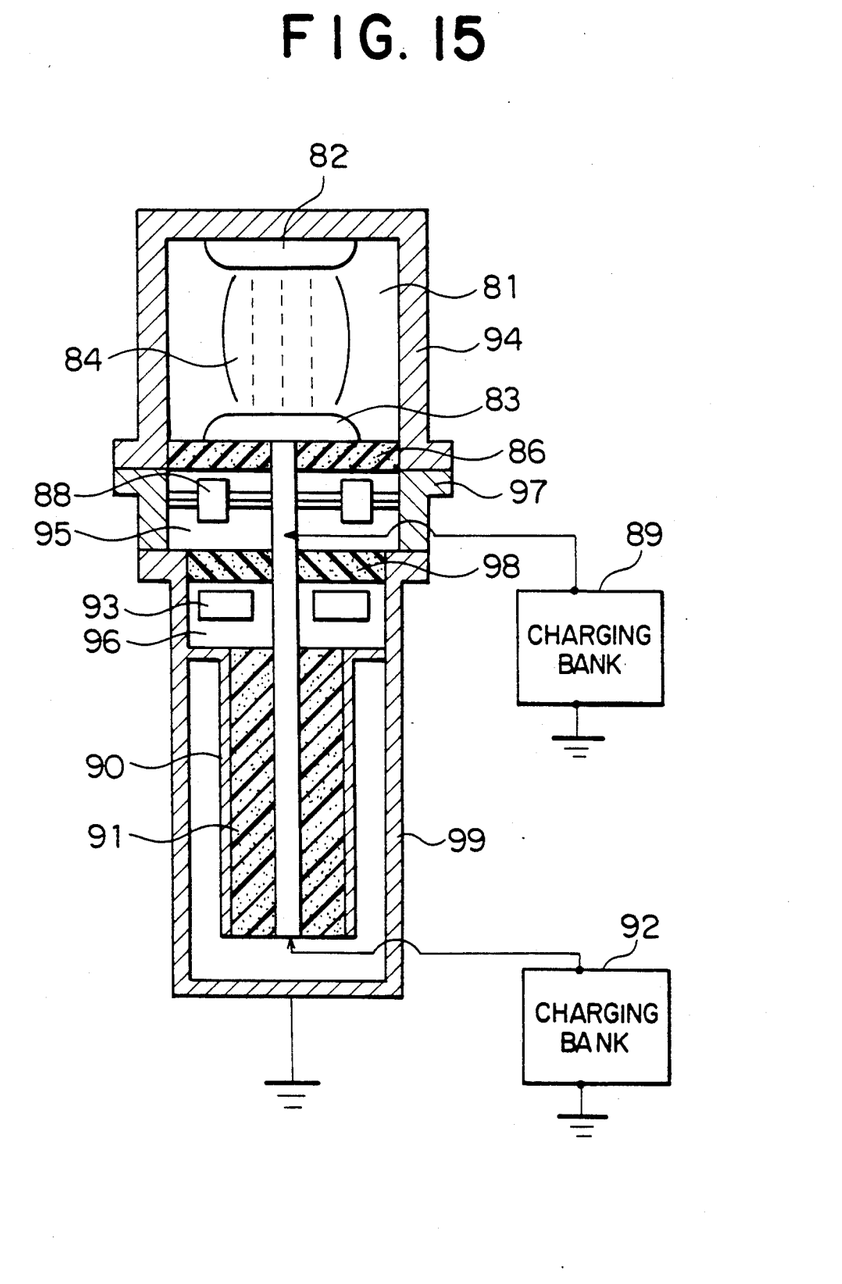
FIG. 15 is a sectional view of another laser oscillator of the present invention.

FIG. 15 illustrates another embodiment of the laser oscillator of the present invention in which the first capacitors 88 which are circuit components of the excitation circuit are disposed within the first circuit component chamber 95. With this arrangement, the laser excitation discharge 84 is advantageously stable because of the reduced structural inductance between the first capacitors 88 and the excitation discharge 84. If desired, any other suitable circuit component may be mounted within the first circuit component chamber 95.

Figure 16:
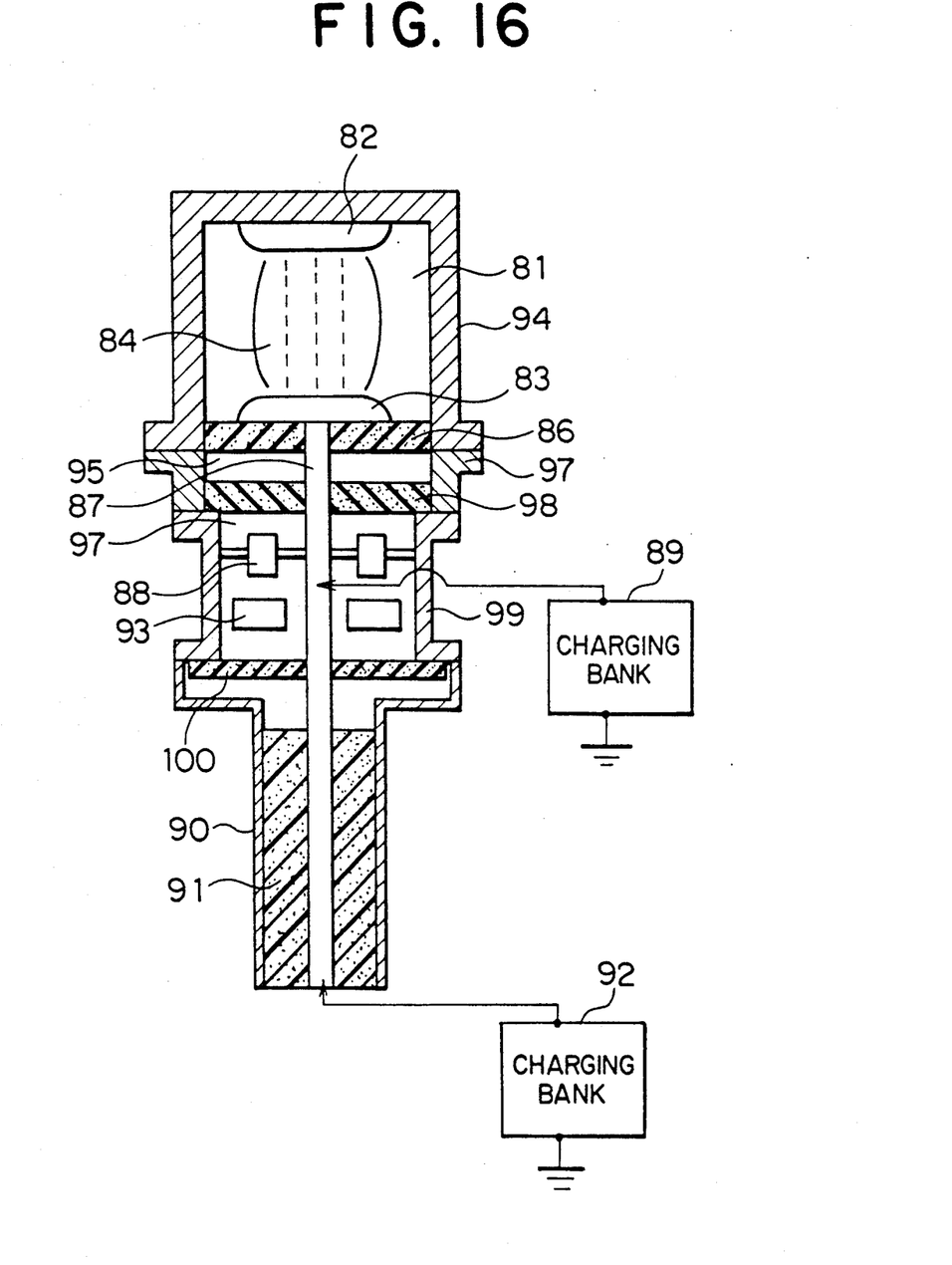
FIG. 16 is a sectional view of a further embodiment of the laser oscillator of the present invention

FIG. 16 illustrates a further embodiment of the laser oscillator of the present invention in which a third insulating partition wall 100 is provided at the end of the casing 99 to isolate the second capacitor 90 from the circuit components such as the capacitors 88 and the magnetic saturable switches 93 mounted within the second circuit component chamber 96 so that the second capacitor 90 is mounted at the exterior of the circuit component chambers 95 and 96.

The second capacitor 90 having the dielectric material 91 therein may be replaced with a usual door-knob capacitor similar to the first capacitors 88. Also, the casing 94 defining the laser chamber 81, the hollow tubular member 97 defining the first circuit component chamber 95 and the second casing 99 defining the second circuit component chamber 96, which are all separate components in the illustrated embodiments, may be integrally formed into a single piece component.

As has been described, the laser oscillator of the present invention comprises a laser chamber in which a laser gas is filled, a first circuit component chamber disposed adjacent to the laser chamber and filled with an electrically insulating gas for accommodating therein at least some of circuit components of the oscillation circuit, and a second circuit component chamber disposed adjacent to the first circuit component chamber and filled with an electrically insulating oil for accommodating therein at least some of circuit components of the oscillation circuit. Therefore, undesirable ingress of the insulating oil into the laser chamber is prevented and the laser gas is prevented from being deteriorated due to the presence of the first circuit component chamber filled with the insulating gas between the oil-filled chamber and the laser chamber. Also, since the mechanical stress acting on the relatively weak insulating partition wall is decreased the reliability of the laser oscillator is significantly improved.

What is claimed is:

1. A laser oscillator comprising:
   a laser chamber in which a laser gas is filled;
   a main electrode pair disposed within said laser chamber in an opposing relationship to define a laser-excited discharge region;
   an oscillation circuit connected across said electrode pair for applying a high voltage thereacross to generate laser-excited discharge and for supplying an excitation energy to said laser-excited discharge region to generate a laser oscillation;
   a first circuit component chamber disposed adjacent to said laser chamber and filled with an electrically insulating gas for accommodating therein at least some of circuit components of said oscillation circuit; and
   a second circuit component chamber disposed adjacent to said first circuit component chamber and filled with an electrically insulating oil for accommodating therein at least some of circuit components of said oscillation circuit.

2. A laser oscillator as claimed in claim 1, wherein said first circuit component chamber is disposed on one side of a first insulating partition wall and is defined by the first partition wall, a ring-shaped member and a second insulating partition wall, and said second circuit component chamber is defined by the second insulating partition wall and a substantially cup-shaped casing attached to the second partition wall.

3. A laser oscillator as claimed in claim 1, wherein said insulating gas filled in the first chamber is pressurized to balance with the pressure of the laser gas filled in the laser chamber.

4. A laser oscillator as claimed in claim 2, wherein said first insulating partition wall is made of a material selected from the group essentially consisting of tetrafluoroethylene and vinyl chloride.

5. A laser oscillator as claimed in claim 1, wherein first capacitors which are circuit components of the oscillator circuit are disposed within the first circuit component chamber.

6. A laser oscillator as claimed in claim 1, further comprising a casing defining said laser chamber and said first and second circuit component chamber, and wherein a third insulating partition wall is provided within the casing to isolate at least one second capacitor from the circuit components such as magnetic saturable switches within the second chamber so that the at least one second capacitor is mounted at an exterior of the circuit component chamber.

7. A laser oscillator as claimed in claim 1, further comprising a casing defining said laser chamber, and said first and second circuit component chambers, wherein said casing is an integrally formed single piece member.

8. A laser oscillator as claimed in claim 6, wherein said magnetic saturable switches include a saturable reactor comprising:
   a magnetic core having a race-track configuration;
   an electrical insulator assembly disposed around said magnetic core;
   a conductor winding wound around insulator assembly around said magnetic core; and
   means disposed between said magnetic core and said insulator assembly for defining a cooling duct extending radially transversely across said magnetic core and having an inlet and an outlet radially separated from one another.

9. A laser oscillator as claimed in claim 8, wherein said saturable reactor comprises an insulating housing disposed around said magnetic core to define a core duct around said magnetic core, and wherein a single-turn conductor winding including an inner conductor and an outer conductor is provided, at least one of said inner conductor and said outer conductor having a cavity communicating with slits formed in said at least one of said conductors, thereby defining a cooling medium passage extending through said insulating housing around said magnetic core.

10. A laser oscillator as claimed in claim 9, wherein in said saturable reactor both of said inner and said outer conductors have said cavities.

11. A laser oscillator as claimed in claim 9, wherein in said saturable reactor a plurality of magnetic cores are disposed between the inner and the outer conductors, and an electrically insulating member having a plurality of partition walls is disposed between each of said magnetic core, said inner conductor and said outer conductor, and said partition walls of said insulating member have formed therein a plurality of slits communicating with the core duct defined around the magnetic cores.

12. A laser oscillator as claimed in claim 6, wherein said magnetic switches include a saturable reactor comprising:
   an annular magnetic core;
      a conductor winding including a first conductor surrounded by said magnetic core and a second conductor disposed around said magnetic core and connected to said first conductor through a load; and
      a control winding extending through said first and second conductors, said control winding being electrically insulated from said first and second conductors, and at least one of said first and second conductors having a notch or a through hole for receiving at least one of said first and second conductors.

13. A laser oscillator as claimed in claim 12, wherein in said saturable reactor said first conductor has formed in its cylindrical circumferential surface a notch through which the control winding extends without projecting from an imaginary cylindrical surface continuous from the cylindrical surface of the first conductor.

14. A laser oscillator as claimed in claim 13, wherein in said saturable reactor said notch is filled with an electrically insulating material so that the control winding is electrically insulatingly supported from the first conductor.

15. A laser oscillator as claimed in claim 14, wherein in said saturable reactor said insulating material has a cylindrical outer surface which provides a continuous complete circular cylindrical surface together with the cylindrical surface of the magnetic core.

16. A laser oscillator as claimed in claim 12, wherein in said saturable reactor said second conductor has formed in its cylindrical wall an axially extending through hole through which the control winding extends.

17. A laser oscillator as claimed in claim 16, wherein in said saturable oscillator said through hole is filled with an electrically insulating material to insulatingly support the control winding from the second conductor.

18. A laser oscillator as claimed in claim 12, wherein in said saturable oscillator each of the first conductor and the second conductor has an axially extending groove of a substantially rectangular cross-section, said grooves are filled with an insulating material to insulatably support the control winding within the grooves.

19. A laser oscillator as claimed in claim 18, wherein in said saturable oscillator said magnetic core is disposed between the first and the second conductors with substantially no air gap therebetween.

20. A laser oscillator as claimed in claim 12, wherein in said saturable oscillator a through hole of a circular cross-section is formed to axially extend through each of the first and the second conductors, and said control winding is insulatingly supported within the through holes by an insulating material.

21. A laser oscillator as claimed in claim 12, said saturable oscillator further comprising a thin, electrically insulating sheet inserted between the first conductor and the magnetic core as well as the magnetic core and the second conductor.

22. A laser oscillator as claimed in claim 12, wherein in said saturable oscillator said control winding comprises a sheathed conductor.

23. A laser oscillator as claimed in claim 12, wherein in said saturable oscillator said magnetic core has a race-track configuration.

* * * * *